United States Patent
MacAdam

(10) Patent No.: US 7,907,625 B1
(45) Date of Patent: Mar. 15, 2011

(54) POWER REDUCTION TECHNIQUE FOR BUFFERED CROSSBAR SWITCH

(75) Inventor: Angus David Starr MacAdam, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 273 days.

(21) Appl. No.: 12/185,716

(22) Filed: Aug. 4, 2008

(51) Int. Cl.
*H04L 12/28* (2006.01)
*H04L 12/56* (2006.01)

(52) U.S. Cl. ........ 370/412; 370/413; 370/401; 370/389; 370/357

(58) Field of Classification Search .......... 370/503, 370/505, 506, 535, 536, 537, 538, 539, 541, 370/542, 543, 545, 465, 468, 412–419, 401, 370/351, 389, 357; 375/359
See application file for complete search history.

(56) References Cited

U.S. PATENT DOCUMENTS

| | | | |
|---|---|---|---|
| 4,314,367 A | 2/1982 | Bakka et al. | |
| 5,511,070 A | 4/1996 | Lyles | |
| 6,014,690 A | 1/2000 | VanDoren et al. | |
| 6,249,520 B1 | 6/2001 | Steely et al. | |
| 6,272,127 B1 | 8/2001 | Golden et al. | |
| 7,010,607 B1 | 3/2006 | Bunton | |
| 7,020,133 B2 | 3/2006 | Zhao et al. | |
| 7,145,904 B2 | 12/2006 | Zhao et al. | |
| 7,154,905 B2 * | 12/2006 | Shin et al. | 370/465 |
| 7,155,553 B2 | 12/2006 | Lueck et al. | |
| 7,210,056 B2 * | 4/2007 | Sandven et al. | 713/600 |
| 7,274,701 B2 | 9/2007 | Boduch et al. | |
| 7,304,987 B1 | 12/2007 | James et al. | |
| 7,305,492 B2 | 12/2007 | Bryers et al. | |
| 7,406,086 B2 | 7/2008 | Deneroff et al. | |
| 7,529,217 B2 * | 5/2009 | Pister et al. | 370/338 |
| 7,602,811 B2 * | 10/2009 | Porter et al. | 370/503 |
| 7,606,151 B2 * | 10/2009 | Chilukoor | 370/230 |
| 7,742,486 B2 * | 6/2010 | Nielsen et al. | 370/401 |
| 2002/0199205 A1 | 12/2002 | Sonawane et al. | |
| 2003/0107996 A1 | 6/2003 | Black et al. | |
| 2004/0017804 A1 | 1/2004 | Vishnu | |
| 2004/0103218 A1 | 5/2004 | Blumrich et al. | |
| 2004/0151209 A1 * | 8/2004 | Cummings et al. | 370/503 |
| 2005/0207436 A1 * | 9/2005 | Varma | 370/412 |

(Continued)

OTHER PUBLICATIONS

Xin Li, Latfi Mhamdi, Jung Liu, Konghong Pun, and Mournir Hamdi, "1.3 Buffered Crossbar Switches," High-performance Packet Switching Architectures, pp. 12-13 and 36-37, Springer London, Aug. 30, 2006.

Zhen Guo, Roberto Rojas-Cessa, and Nirwan Ansari "Packet Switch with Internally Buffered Crossbars," High-performance Packet Switching Architectures, pp. 121-146, Springer London, Aug. 30, 2006.

(Continued)

*Primary Examiner* — Ayaz R Sheikh
*Assistant Examiner* — Chuong T Ho
(74) *Attorney, Agent, or Firm* — Kenneth Glass; Stanley J. Pawlick; Glass & Associates

(57) ABSTRACT

A communication system that includes a packet switch having a buffered crossbar for routing data packets from input ports to output ports of the packet switch. The buffered crossbar stores a data packet received from an input port based on a clock signal of a clock domain and sends the data packet to an output port of the packet switch based on a clock signal of another clock domain. In this way, the buffered crossbar functions as a clock domain boundary between the input port and the output port. Moreover, the frequency of one or both of the clock signals may be selected to minimize power consumption in the packet switch or to select a tradeoff between power consumption and performance of the packet switch.

14 Claims, 6 Drawing Sheets

U.S. PATENT DOCUMENTS

2006/0028987 A1  2/2006  Alexander Gildfind et al.
2006/0120498 A1*  6/2006  Wong et al. .................. 375/359
2006/0221948 A1  10/2006  Benner et al.

OTHER PUBLICATIONS

Kenji Yoshigoe and Ken Christensen "The Combined Input and Crosspoint Queued Switch," High-performance Packet Switching Architectures, pp. 169-195, Springer London, Aug. 30, 2006.

Xiao Zhang and Laxmi N. Bhuyan, "Deficit Round-Robin Scheduling for Input-Queued Switches" IEEE Journal on Selected Areas in Communications, pp. 584-594, vol. 21, No. 4, May 2003.

M Shreedhar and George Varghese, "Efficient Fair Queuing Using Deficit Round Robin" IEEE/ACM Transactions on Networking, pp. 375-385, vol. 4, No. 3, Jun. 1996.

Kang Xi, Shin'ichi Arakawa, Masayuki Murata, Ning Ge and Chongxi Feng, "Packet-Mode Scheduling with Proportional Fairness for Input-Queued Switches" IEICE Trans. Commun., pp. 4274-4284, vol. E88-B, No. 11 Nov. 2005.

* cited by examiner

POWER REDUCTION TECHNIQUE FOR BUFFERED CROSSBAR SWITCH

BACKGROUND

A packet-switched communication network includes one or more packet switches for routing data packets through the network. Some types of packet-switched communication networks include a buffered crossbar switch. The buffered crossbar switch includes a buffered crossbar for routing data packets from input ports of the packet switch to output ports of the packet switch. The buffered crossbar is connected to each input port and each output port of the packet switch and includes switching elements for selectively establishing communication paths between the input ports and the output ports. Each switching element, also known as a crosspoint, is capable of storing a portion of a data packet received from an input port and providing the portion of the data packet to an output port of the packet switch. By storing each portion of a data packet in the switching element as the packet switch routes the data packet from the input port to the output port, the buffered crossbar buffers the data packet.

Power consumption is often an important design criterion for a buffered crossbar switch. Some known techniques for managing power consumption in a buffered crossbar switch include selectively disabling inactive ports, gating a system clock, and employing low-power design synthesis tools for designing the buffered crossbar. Although these techniques have been successfully employed to reduce power consumption in some buffered crossbar switches, power consumption remains a concern in the design of a buffered crossbar switch.

In light of the above, a need exists for reducing power consumption in a buffered crossbar switch.

SUMMARY

In various embodiments, a communication system includes a packet switch including a buffered crossbar for routing data packets from input ports to output ports of the packet switch. Additionally, the packet switch includes clock modules corresponding to the input ports. Each of the clock modules generates an output clock signal for a corresponding input port. Moreover, each of the output clock signals of the input ports has a corresponding clock domain. Further, the buffered crossbar includes crosspoints, each of which is capable of receiving one or more data units of a data packet from an input port corresponding to the crosspoint and storing the data unit based on the output clock signal corresponding to the input port. Additionally, each crosspoint is capable of sending a data unit of a data packet received from an input port to an output port corresponding to the crosspoint based on an input clock signal of the output port, which is in another clock domain.

Because each of the crosspoints stores a data unit of a data packet received from a corresponding input port based on a clock signal of one clock domain and sends the data unit of the data packet to a corresponding output port based on a clock signal of another clock domain, the crosspoint functions as a clock domain boundary between the input port and the output port. Moreover, the output bandwidth of each input port is based on both the frequency of the output clock signal of the input port and the width of data sent from the input port to the buffered crossbar. Power consumption in the packet switch is based on the frequencies of the output clock signals of the input ports. Performance of the packet switch is based on the input bandwidths and the output bandwidths of the input ports. In various embodiments, a user may select the frequencies of the output clock signals of the input ports to minimize power consumption in the packet switch. For example, a user may select an output bandwidth of an input port based on the input bandwidth of the input port. Further, the user may select the frequency of the output clock signal of the input port such that the input port has the selected output bandwidth. In this way, the user selects a tradeoff between power consumption and performance of the packet switch.

In some embodiments, an input port receives a serial data stream containing a data packet transmitted to the packet switch based on a transmit clock signal. The clock module corresponding to the input port reconstructs the transmit clock signal based on the serial data stream and converts the serial data stream into symbols of the data packet based on the reconstructed clock signal. Additionally, the input port decodes the symbols into data units of the data packet and sends the data units of the data packet to the buffered crossbar switch in the packet switch based on the reconstructed clock signal. For example, the input port may generate the output clock signal of the input port by multiplying or dividing the frequency of the reconstructed clock signal. The buffered crossbar sends the data units of the data packet to an output port of the packet switch based on a system clock signal and the output port outputs the data units from the packet switch. Because the input port sends the data units of the data packet to the buffered crossbar based on the reconstructed clock signal, the packet switch need not include additional circuitry for generating another clock signal for sending the data units of the data packet to the buffered crossbar, which would otherwise consume power in the packet switch. In this way, power consumption is further reduced in the packet switch.

In some embodiments, an input port receives a data packet and sends one or more data units of the data packet to more than one crosspoint in the buffered crossbar. Each of these crosspoints sends the data unit to the output port corresponding to the crosspoint. In turn, the output ports output the data units from the packet switch. In this way, the packet switch multicasts the data units of the data packet to multiple output ports and outputs the data units from those output ports.

In various embodiments, the packet switch includes a configuration module for selecting a frequency of the output clock signal of an input port based on user input to the packet switch. For example, a user may select an output bandwidth of an input port in the packet switch and provide input to the configuration module indicating the frequency of the output clock signal of the input port such that the input port has the selected output bandwidth. In this way, the packet switch is programmable to select the output bandwidth of the input port based on the user input. Moreover, a user may program the packet switch to select the frequency of the output clock signal of the input port, and thus selecting the output bandwidth of the input port, for reducing power consumption in the packet switch.

For example, a user may program the packet switch to minimize the frequency of the output clock signal of an input port in the packet based on an input bandwidth of the input port such that output bandwidth of the input port in minimized but inhibits data overflow from occurring in the input port. Because the frequency of the output clock signal of the input port is minimized, the output clock signal of the input port toggles less frequently and power consumption is reduced in the packet switch. Moreover, the user may program the packet switch to select a tradeoff between power consumption and performance of the packet switch by individually selecting the frequencies of the output clock signals of the input ports to determine the output bandwidths of the input ports.

A packet switch, in accordance with one embodiment, includes an input port, an output port, and a buffered crossbar coupled to the input port and the output port. The input port is configured to receive a data packet containing one or more data units and send one or more of the data units of the data packet to the crosspoint. The crosspoint is configured to store one or more of the data units of the data packet based on a clock signal of a first clock domain and send one or more data units of the data packet to the output port based on a clock signal of a second clock domain. The output port is configured to output data units of the data packet from the packet switch.

A system, in accordance with one embodiment, includes source devices, destination devices, and a packet switch coupled to the source devices and the destination devices. The packet switch includes input ports, clock modules, and output ports. The input ports are configured to receive data packets from the source devices. Each of the clock modules is configured to generate a clock signal for a corresponding input port. Each of the clock signals is in a clock domain corresponding to that clock signal. The buffered crossbar includes crosspoints each of which is configured to receive one or more data units of a data packet from a corresponding input port, store one or more of the data units of the data packet based on the clock signal of the input port, and send one or more data units of the data packet to a corresponding output port based on a clock signal of the output port in another clock domain. The output ports are configured to output data units of the data packets to the destination devices.

A method of routing data packets through a packet switch, in accordance with one embodiment, includes receiving a data packet at an input port of the packet switch, generating a clock signal of a first clock domain, and sending one or more data units of the data packet to a buffered crossbar. The method further includes storing one or more of the data units of the data packet in a crosspoint of the buffered crossbar based on the clock signal of the first clock domain and sending one or more of the data units of the data packet to an output port of the packet switch based on a clock signal of a second clock domain. Additionally, the method includes outputting one or more data units of the data packet from the packet switch.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a communication system includes a packet switch including a buffered crossbar for routing data packets from input ports to output ports of the packet switch. The packet switch generates an output clock signal for each of the input ports. Each of the output clock signals of the input ports has a corresponding clock domain. Each input port receives data packets and sends data units of the data packets to the buffered crossbar. The buffered crossbar stores data units received from each input port based on the output clock signal of the input port. Additionally, the buffered crossbar sends the data units of the data packets to output ports of the packet switch based on one or more input clock signals of the output ports, each of which is in another clock domain. Because the buffered crossbar stores a data packet received from an input port based on a clock signal in one clock domain and sends the data packet to an output port based on a clock signal of another clock domain, the buffered crossbar functions as a clock domain boundary between the input port and the output port. Moreover, the frequencies of the output clock signals of the input ports and the input clock signals of the output ports may be selected to minimize power consumption in the packet switch or select a tradeoff between power consumption and performance of the packet switch.

Figure 1:
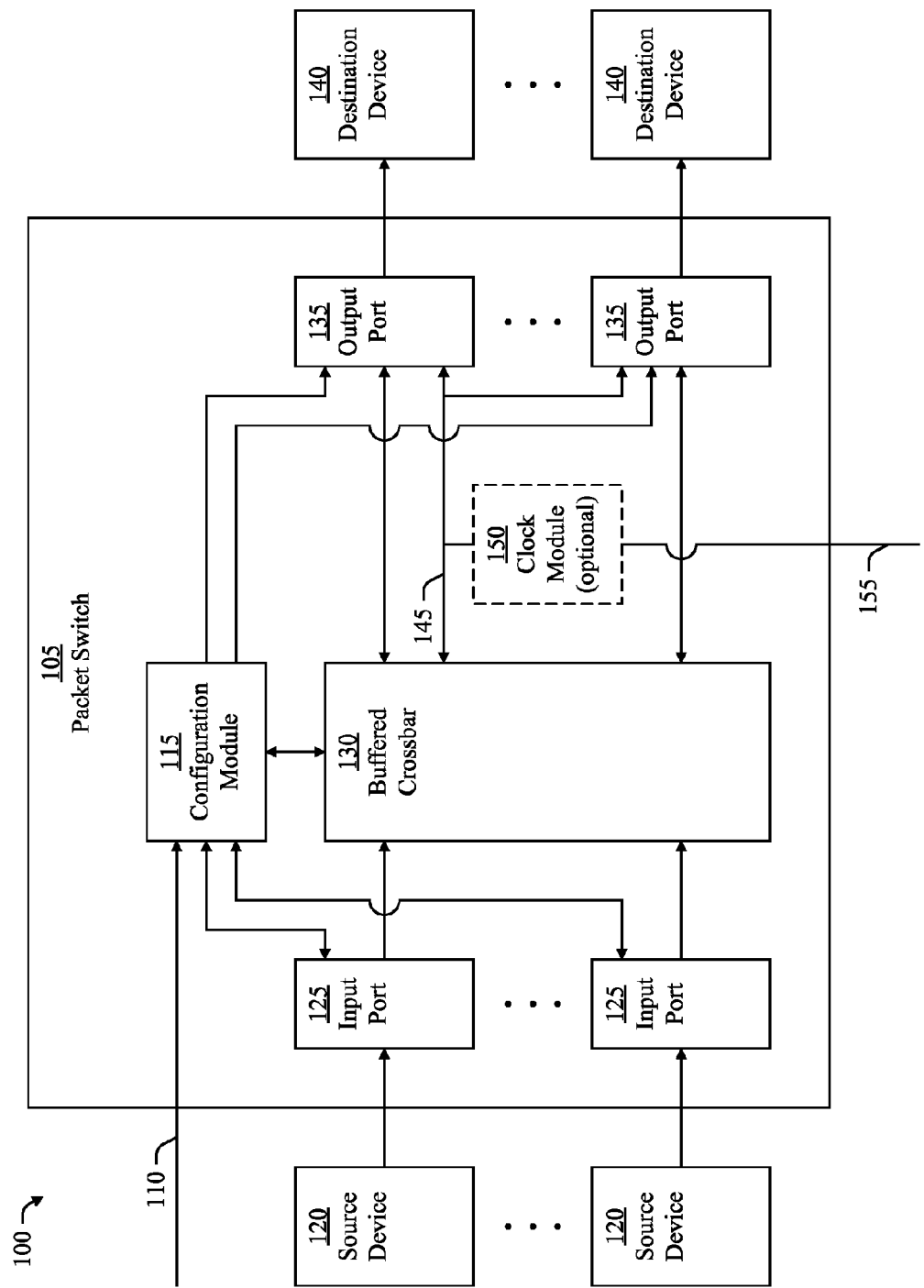
FIG. 1 is a block diagram of a communication system, in accordance with an embodiment of the present invention.

FIG. 1 illustrates a communication system 100, in accordance with one embodiment of the present invention. The communication system 100 includes a packet switch 105, source devices 120, and destination devices 140. Each of the source devices 120 and the destination devices 140 is coupled (e.g., connected) to the packet switch 105. In operation, the source devices 120 send data packets to the packet switch 105 and the packet switch 105 routes the data packets to the destination devices 140 based on contents of the data packets. In some embodiments, the packet switch 105 routes data packets from the source devices 120 to the destination devices 140 based on a serial RapidIO™ (sRIO) standard. In some embodiments, the packet switch 105 is a single semiconductor die. In other embodiments, packet switch 105 includes multiple semiconductor die that are electrically coupled together such as, for example, a multi-chip module that is packaged in a single integrated circuit package.

The packet switch 105 includes a configuration module 115, input ports 125, a buffered crossbar 130, output ports 135, and an optional clock module 150. Each input port 125 corresponds to a source device 120 and is coupled (e.g., connected) to the source device 120. Each of the output ports 135 corresponds to a destination device 140 and is coupled (e.g., connected) to the destination device 140. Additionally, each of the input ports 125 and each of the output ports 135 is coupled (e.g., connected) to the buffered crossbar 130. In various embodiments, one or more of the source devices 120 or one or more of the destination devices 140 is an endpoint device that functions as both a source device 120 and a destination device 140. For example, a source device 120 or a destination device 140 may be another packet switch 105.

In operation, an input port 125 receives a data packet from the source device 120 corresponding to the input port 125, generates an output clock signal corresponding to the input port 125, and sends the data packet to the buffered crossbar 130. In turn, the buffered crossbar 130 stores the data packet, or portions thereof, based on the output clock signal of the input port 125. The buffered crossbar 130 routes the data packet, or portions thereof, to an output port 135 based on another clock signal such as, for example, an input clock signal of the output port 135. Moreover, the output clock signal of the input port 125 and the clock signal for routing the data packet from the buffered crossbar 130 to the output port 135 are in different clock domains. In this way, the buffered crossbar 130 functions as a clock domain boundary between the input port 125 and the output port 135.

In various embodiments, an input port 125 receives data packets at an input data rate (e.g., an input bandwidth) and sends data packets to the buffered crossbar 130 at an output data rate (e.g., an output bandwidth). For example, the input port 125 may receive data packets in a serial data stream (e.g., a bit stream) at an input data rate of five gigabits per second (5 Gb/s), convert the serial data stream into symbols, decode the symbols into data units of a data packet, and send the data units of the data packet to the buffered crossbar 130 at an output data rate of eight gigabits per second (8 Gb/s). In this example, the output data rate (e.g., output bandwidth) of the input port 125 is higher than the input data rate (e.g., input bandwidth) of the input port 125. In this way, the output clock signal of the input port 125 is overclocked to improve throughput of the packet switch. For example, the output clock signal of the input port 125 may be overclocked to compensate for overhead involved in handing data packets received by the input port 125.

The configuration module 115 is coupled to one or more of the input ports 125, the buffered crossbar 130, or one or more of the output ports 135, or some combination thereof. The configuration module 115 configures (e.g., programs) the packet switch 105, for example based on information received from a user through a communication channel 110. In various embodiments, the configuration module 115 selects the frequency of the output clock signal of an input port 125. For example, the configuration module 115 may select the frequency of the output clock signal of an input port 125 based on user input to the configuration module 115 to reduce or minimize the frequency of the output clock signal of the input port 125 for a desired (e.g., selected) output bandwidth of the input port 125. Because the frequency of the output clock signal of the input port 125 is reduced or minimized, the output clock signal of the input port 125 toggles less frequently which reduces or minimizes power consumption in the packet switch 105. In various embodiments, the configuration module 115 selects the frequency of the output clock signal of each input port 125 based on user input to the configuration module 115. In this way, a user may configure the packet switch 105 to optimize (e.g., reduce or minimize) power consumption in the packet switch 105. For example, a user may configure the packet switch 105 to optimize (e.g., reduce or minimize) the frequency of each output clock signal of the input ports 125 based on the desired (e.g., selected) output bandwidths of the input ports 125.

The clock module 150 generates a clock signal 145 based on a clock signal 155 received by the packet switch 105. For example, the clock module 150 may generate the clock signal 145 by dividing or multiplying the frequency of the clock signal 155, increasing the drive of the clock signal 155, buffering the clock signal 155, or some combination thereof. In some embodiments, the clock module 150 includes a phase-lock loop or a delay-lock loop for controlling the frequency of the clock signal 145. In further embodiments, the clock module 150 generates multiple clock signals 145 and provides each of the clock signals 145 to a different component of the packet switch 105. For example, the clock module 150 may include a clock tree and provide a buffered clock signal 145 to the buffered crossbar 130, another buffered clock signal 145 to the output ports 135, and still another buffered clock signal 145 to the configuration module 115. In some embodiments, the clock signal 145 is a system clock signal of the packet switch 105. In other embodiments without the optional clock module 150, the clock signal 155 is a system clock signal of the packet switch 105.

Figure 2:
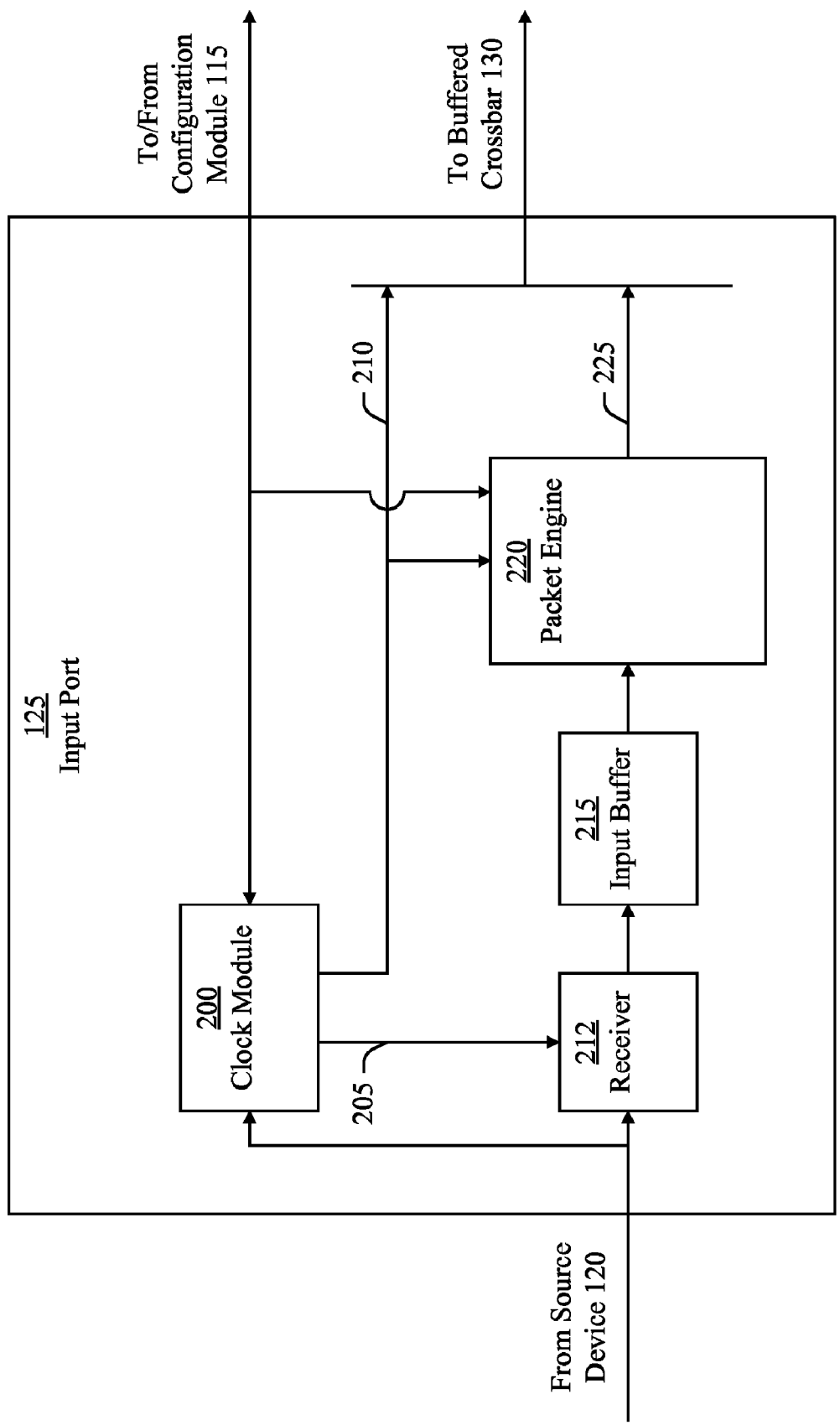
FIG. 2 is a block diagram of an input port, in accordance with an embodiment of the present invention.

FIG. 2 illustrates an input port 125, in accordance with an embodiment of the present invention. The input port 125 includes a clock module 200, a receiver 212, an input buffer 215, and a packet engine 220. The clock module 200 is coupled (e.g., connected) to the receiver 212, the input buffer 215, and the packet engine 220. Additionally, the input buffer 215 is coupled (e.g., connected) to the receiver 212 and the packet engine 220.

The clock module 200 generates an input clock signal 205 of the input port 125 and provides the input clock signal 205 of the input port 125 to the receiver 212. Additionally, the clock module 200 generates an output clock signal 210 of the input port 125 and provides the output clock signal 210 of the input port 125 to the packet engine 220 and the buffered crossbar 130. The receiver 212 receives data packets from the source device 120 corresponding to the input port 125 and writes the data packets, or data units of the data packets, into the input buffer 215, based on the input clock signal 205 of the input port 125. For example, the receiver 212 may receive a data packet in a serial data stream and convert data bits in the serial data stream into data units of the data packet. Further in this example, the receiver 212 may divide the frequency of the input clock 205 and write the data units of the data packets into the input buffer 215 based on the divided clock signal. In this way, the receiver 212 writes the data units of the data packet into the input buffer 215 based on the input clock signal 205 of the input port 125. The packet engine 220 reads data units of data packets from the input buffer 215 and routes the data units of the data packets to the buffered crossbar 130, based on the output clock signal 210 of the input port 125. In various embodiments, the packet engine 220 routes a data packet to the buffered crossbar 130 by providing data 225 of the data packet, such as a data unit of the data packet, to the buffered crossbar 130. In various embodiments, a data unit may be any unit of data, such as a data bit, a data byte, a data word, or an entire data packet.

In various embodiments, the clock module 200 generates the input clock signal 205 of the input port 125 and the output clock signal 210 of the input port 125 such that the data rate at which the input port 125 receives data (e.g., data packets) from the source device 120 corresponding to the input port 125 is less than the data rate at which the packet engine 220 sends data (e.g., data packets) to the buffered crossbar 130. In this way, the clock module 200 overclocks the output clock signal 210 of the input port 125 to inhibit (e.g., prevent) data overflow from occurring in the input buffer 215. In other embodiments, the input clock signal 205 of the input port 125 is the same as the output clock signal 210 of the input port 125.

In various embodiments, the input port 125 receives data packets in a serial data stream (e.g., a bit stream) and stores data bits of the serial data stream. In these embodiments, the source device 120 corresponding to the input port 125 transmits the serial data stream to the input port 125 based on a transmit clock signal. In turn, the clock module 200 generates the input clock signal 205 of the input port 125 by reconstructing the transmit clock signal based on the serial data stream, and the receiver 212 converts data bits of the serial data stream into symbols (e.g., data symbols) based on the input clock signal 205 of the input port 125. Further, the receiver 212 generates data units of data packets by decoding the symbols and writes the data units into the input buffer 215, based on the input clock signal 205 of the input port 125. Additionally, the clock module 200 generates the output clock signal 210 of the input port 125 based on the input clock signal 205 of the input port 125, for example by scaling the frequency of the input clock signal 205 of the input port 125. The packet engine 220 reads data units of data packets from the input buffer 215 and sends the data units of the data packets to the buffered crossbar 130, based on the output clock signal 210 of the input port 125.

For example, a data unit of a data packet may be a data byte and the packet engine 220 may send the data packet to the buffered crossbar 130 using a cut-through routing technique by individually sending the data bytes of the data packet to the buffered crossbar 130. In this way, latency for routing the data packet through the packet switch 105 is reduced and performance of the packet switch 105 is improved. As another example, the packet engine 220 may send the data packet to the buffered crossbar 130 by using a store-forward technique. In the store-forward technique, the input port 125 accumulates and stores the entire data packet. The packet engine 220 then sends the data packet to the buffered crossbar 130 by sending the data units of the data packet to the buffered crossbar 130. In this way, the input port 125 containing the packet engine 220 may perform error checking on the data packet before the packet engine 220 sends any data units of the data packet to the buffered crossbar 130.

In one embodiment, the receiver 212 converts data bits in the data stream into 10-bit symbols and converts the 10-bit symbols into 8-bit data bytes. Further, the packet engine 220 combines the 8-bit data bytes into 64-bit data units. In this embodiment, the clock module 200 generates the input clock signal 205 of the input port 125 by reconstructing the transmit clock signal from the data stream and generates the output clock signal 210 of the input port 125 by scaling the frequency of the input clock signal 205 of the input port 125. For example, an input port 125 may receive the data stream at a data rate of five gigabits per second (5 Gb/s), and the clock module 200 may generate the input clock signal 205 of the input port 125 having a frequency of five gigahertz (5 GHz). Further, the clock module 200 may generate the output clock signal 210 of the input port 125 by dividing the frequency of the input clock signal 205 of the input port 125 by a scaling factor of forty such that the output clock signal 210 of the input port 125 has a frequency of one-hundred-twenty-five megahertz (125 MHz). In this example, the output data rate of the input port 125 is the width of a data unit times the frequency of the output clock signal 210 of the input port 125. Thus, the output data rate of the input port 125 is eight gigabits per second (8 Gb/s). Because the output bandwidth of the input port 125 is higher than the input bandwidth of the input port 125, the input port 125 inhibits (e.g., prevents) data overflow from occurring in the input buffer 215.

Additionally, the clock module 200 may overclock the output clock signal 210 of the input port 125 by increasing the frequency of the output clock signal 210 of the input port 125. For example, the clock module 200 may multiply the frequency of the output clock signal 210 of the input port 125 by a clocking factor of two such that the output clock signal 210 of the input port 125 has a frequency of two-hundred-fifty megahertz (250 MHz). In this example, the input data rate (e.g., input bandwidth) of the input port 125 is five gigabits per second (5 Gb/s) and the output data rate (e.g., output bandwidth) of the input port 125 is sixteen gigabits per second (16 Gb/s). Because the output bandwidth of the input port 125 is higher than the input bandwidth of the input port 125, the input port 125 inhibits (e.g., prevents) data overflow from occurring in the input buffer 215.

In some embodiments, the input port 125 receives multiple serial data streams containing data packets. In these embodiments, clock module 200 generates the input clock signal 205 of the input port 125 by reconstructing the transmit clock signal based on at least one of the data streams. Further, the receiver 212 generates symbols based on the data bits in the data streams, and decodes the symbols based on the input clock signal 205 of the input port 125. For example, the serial data streams may include data of a data packet that is striped across the serial data streams. In this example, the receiver 212 generates symbols based on the data of the data packet striped across the serial data streams and decodes the symbols into data units of the data packet.

In further embodiments, the receiver 212 generates data units of data packets by combining (e.g., concatenating) decoded symbols. For example, each of the symbols may be a 10-bit symbol and the receiver 212 may receive four data streams each having a data rate of two-and-a-half gigabits per second (2.5 Gb/s). Further, the receiver 212 may decode the 10-bit symbols into 8-bit data bytes and combine (e.g., concatenate) the data bytes into a 64-bit data unit. In this example, the input data rate of the input port 125 is ten gigabits per second (10 Gb/s), which is the input data rate of each data stream times the number of data streams. Further, the clock module 200 generates the input clock signal 205 of the input port 125 having a frequency of two-and-a-half gigahertz (2.5 GHz) and generates the output clock signal 210 of the input port 125 having a frequency of two-hundred-fifty megahertz (250 MHz) by dividing the frequency of the input clock signal 205 of the input port 125. Further in this example, the output data rate (e.g., output bandwidth) of the input port 125 is sixteen gigabits per second (16 Gb/s), which is frequency of the output clock signal 210 of the input port 125 times the width of a data unit. Because the output bandwidth of the input port 125 is higher than the input bandwidth of the input port 125, the input port 125 inhibits (e.g., prevents) data overflow from occurring in the input buffer 215.

In other embodiments, the receiver 212 of an input port 125 receives data packets in a parallel data steam (e.g., a symbol stream), generates data units of data packets by decoding symbols in the parallel data stream, and writes the data units into the input buffer 215. Additionally, the receiver 212 may generate the data units by combining (e.g., concatenating) the decoded symbols and writing the data units into the input buffer 215. In turn, the input buffer 215 stores the data units of the data packets. The packet engine 220 receives (e.g., reads) the data units of the data packets from the input buffer 215 and sends the data units of the data packets to the buffered crossbar 130, based on the output clock signal 210 of the input port 125. In some embodiments, the input clock signal 205 of the input port 125 is the same as the output clock signal 210 of the input port 125. In some embodiments, the packet engine 220 reads data units from the input buffer 215, combines (e.g., concatenates) the data units into a larger data unit, and sends the larger data unit to the buffered crossbar 130. For example, the packet engine 220 may read eight 8-bit data units from the input buffer 215, concatenate the 8-bit data units to generate a 64-bit data unit, and send the 64-bit data unit to the buffered crossbar 130.

In other embodiments, the frequency of the output clock signal 210 of an input port 125 is higher than, or lower than, the frequency of the input clock signal 205 of the input port 125. In various embodiments, the output data rate of the input port 125 is higher than the input data rate of the input port 125, as is described more fully herein. For example, the symbols in the data stream may be 10-bit symbols and receiver 212 may receive the data stream at a data rate of five gigabits per second (5 Gb/s) decode the symbols into 8-bit data bytes, and generate 64-bit data units by combining (e.g., concatenating) the decoded symbols. Further, the clock module 200 may generate the input clock signal 205 of the input port 125 and the output clock signal 210 of the input port 125 such that the input clock signal 205 of the input port 125 has a frequency of five gigahertz (5 GHz) and the output clock signal 210 of the input port 125 has a frequency of two-hundred-fifty megahertz 250 MHz). Thus, the input data rate (e.g., input bandwidth) of the input port 125 is five gigabits per second (5 Gb/s) and the output data rate (e.g., output bandwidth) of the input port 125 is sixteen gigabits per second (16 Gb/s). Because the output bandwidth of the input port 125 is higher than the input bandwidth of the input port 125, the input port 125 inhibits (e.g., prevents) data overflow from occurring in the input buffer 215.

In various embodiments, the configuration module 115 is coupled (e.g., connected) to the clock module 200 or the packet engine 220, or both. In some embodiments, the configuration module 115 selects the frequency of the output clock signal 210 of an input port 125, for example by writing a data value indicating the frequency into the clock module 200 of the input port 125. For example, the configuration module 115 may write a data value indicating a scaling factor into the clock module 200 and the clock module 200 may generate the output clock signal 210 of the input port 125 by multiplying or dividing the frequency of the input clock signal 205 of the input port 125 by the scaling factor.

In further embodiments, the configuration module 115 selects the frequency of the input clock signal 205 of the input port 125 based on user input, for example by writing a data value indicating the frequency of the input clock signal 205 of the input port 125 into the clock module 200. In turn, the clock module 200 generates the input clock signal 205 of the input port 125 based on the data value such that the input clock signal 205 of the input port 125 has the frequency indicated by the data value. For example, the clock module 200 may generate the input clock signal 205 of the input port 125 based on the clock signal 145 (e.g., a system clock signal) by dividing the frequency of the clock signal 145 by the data value.

In some embodiments, the clock module 200 corresponds to the input port 125 but is external of the input port 125. In some embodiments, the packet engine 220 corresponds to the input port 125 but is external of the input port 125. In some embodiments, the input buffer 215 corresponds to the input port 125 but is external of the input port 125.

Figure 3:
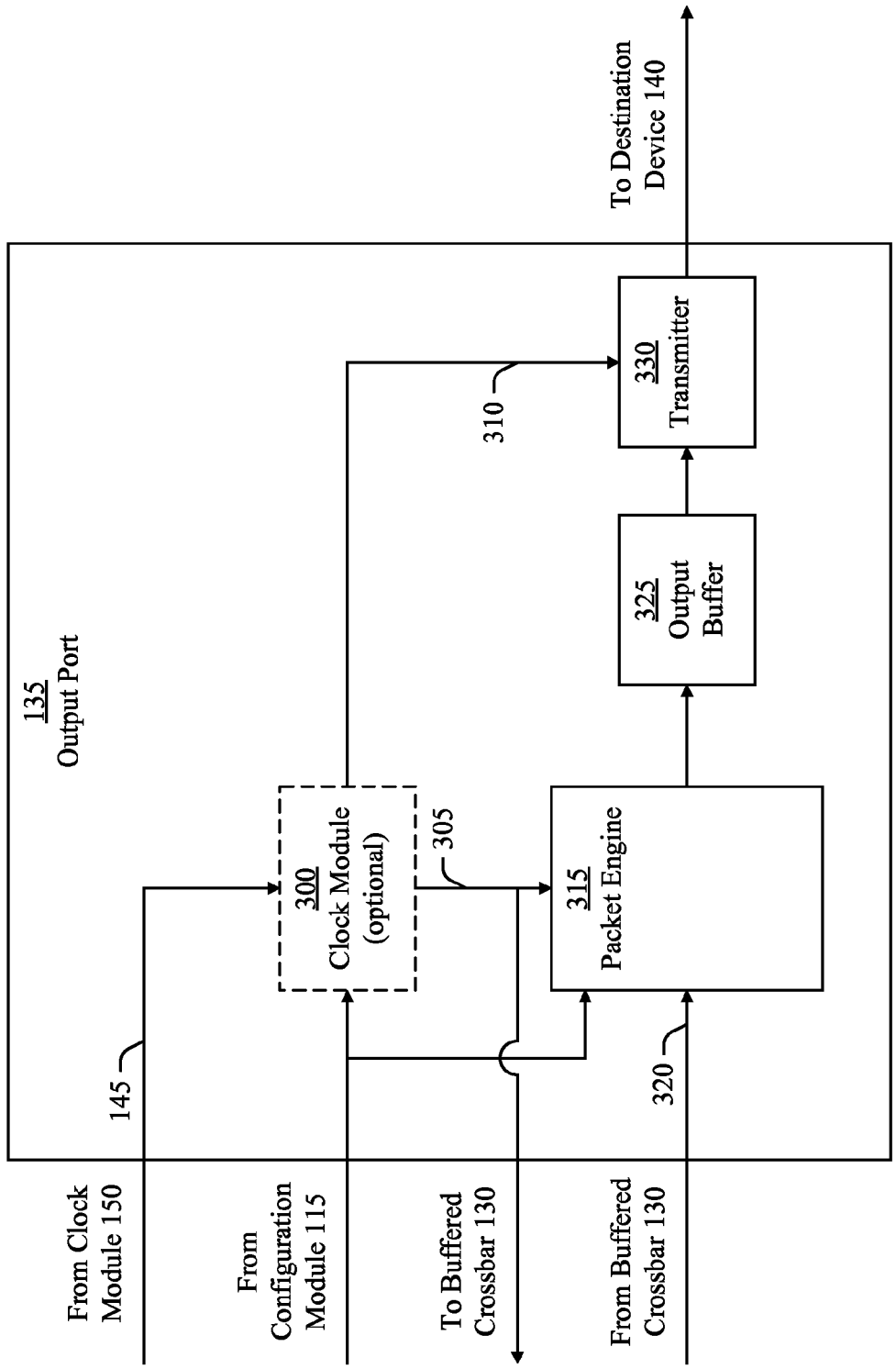
FIG. 3 is a block diagram of an output port, in accordance with an embodiment of the present invention.

FIG. 3 illustrates the output port 135, in accordance with an embodiment of the present invention. The output port 135 includes a packet engine 315, an output buffer 325, and a transmitter 330. The output buffer 325 is coupled (e.g., connected) to the packet engine 315 and the transmitter 330. The packet engine 315 receives data units of data packets from the buffered crossbar 130 and writes the data units of the data packets into the output buffer 325 based on the clock signal 145. For example, the packet engine 315 may receive data units of a data packet from the buffered crossbar 130 and write the data units of the data packet into the output buffer 325 based on the clock signal 305, which is derived from the clock signal 145. In this way, the packet engine 315 writes the data units of the data packet based on the clock signal 145. In turn, the transmitter 330 receives (e.g., reads) data units of the data packets from the output buffer 325 and outputs the data units of the data packets to the destination device 140 corresponding to the output port 135, based on the clock signal 145. In various embodiments, the packet engine 315 receives the data packets from the buffered crossbar 130 by receiving data 320 of the data packet, such as data units of the data packet, from the buffered crossbar 130. For example, a data unit may be a data bit, a data byte, a data word, or an entire data packet.

In various embodiments, the output port 135 includes an optional clock module 300 coupled (e.g., connected) to the packet engine 315, the transmitter 330, and the clock module 150. In these embodiments, the clock module 300 generates an input clock signal 305 of the output port 135 based on the clock signal 145. Further, the packet engine 315 receives data units of data packets from the buffered crossbar 130 and writes the data units of the data packets into the output buffer 325, based on the input clock signal 305 of the output port 135. For example, the clock module 300 may generate the input clock signal 305 of the output port 135 by multiplying or dividing the frequency of the clock signal 145 by a scaling factor. In some embodiments, the output port 135 provides the input clock signal 305 of the output port 135 to the buffered crossbar 130.

Additionally, the clock module 300 generates an output clock signal 310 of the output port 135 based on the clock signal 145. For example, the clock module 300 may generate the output clock signal 310 of the output port 135 by multiplying or dividing the frequency of the clock signal 145 by a scaling factor. The transmitter 330 receives (e.g., reads) data units of the data packets from the output buffer 325 and outputs the data units of the data packets from the packet switch 105 to the destination device 140 corresponding to the output port 135, based on the output clock signal 310 of the output port 135. In some embodiments, the input clock signal 305 of the output port 135 is the same as the output clock signal 310 of the output port 135. In some embodiment, the input bandwidth of the output port 135 is the same as the output bandwidth of the output port 135.

In various embodiments, the packet engine 315 of an output port 135 receives data units of data packets from the buffered crossbar 130 in a parallel data stream and writes the data units into the output buffer 325 based on the input clock signal 305 of the output port 135. In turn, the transmitter 330 receives (e.g., reads) the data units of the data packets from the output buffer 325, generates symbols based on the data units, converts the symbols into a serial data stream, and outputs the serial data stream to the destination device 140 corresponding to the output port 135, based on the output clock signal 310 of the output port 135. For example, the packet engine 315 may receive (e.g., read) 64-bit data units of data packets from the buffered crossbar 130 at a data rate of sixteen gigabits per second (16 Gb/s), and the clock module 300 may generate the input clock signal 305 of the output port 135 by dividing a frequency of the clock signal 145 such that the frequency of the input clock signal 305 of the output port 135 is two-hundred-fifty megahertz (250 MHz). In turn, the packet engine 315 writes the data units of the data packets into the output buffer 325 based on the input clock signal 305 of the output port 135. In this example, the input data rate of the output port 135 is sixteen gigabits per second (16 Gb/s), which is the frequency of the input clock signal 305 of the output port 135 times the width of the data unit.

Further in this example, the clock module 300 generates the output clock signal 310 of the output port 135 based on the clock signal 145 such that the output clock signal 310 of the output port 135 has a frequency of five gigahertz (5 GHz). The transmitter 330 receives (e.g., reads) the data units of the data packets from the output buffer 325, generates symbols based on the data packets, and converts the symbols into two serial data streams, based on the output clock signal 310 of the output port 135. Additionally, the transmitter 330 outputs the serial data streams from the packet switch 105 based on the output clock signal 310 of the output port 135. In this example, the frequency of the output clock signal 310 of the output port 135 (5 GHz) is significantly higher than the frequency of the input clock signal 305 of the output port 135 (250 MHz) because the transmitter 330 outputs forty data bits in each of the serial data streams in forty clock cycles of the output clock signal 310 of the output port 135 for each 64-bit data unit received from the buffered crossbar 130 in a clock cycle of the input clock signal 305 of the output port 135. The output data rate (e.g., output bandwidth) of the output port 135 is ten gigabits per second (10 Gb/s), which is the frequency of the output clock signal 310 of the output port 135 times the number of data streams output from the output port 135. Because the input bandwidth of the output port 135 is higher than the output bandwidth of the output port 135, the output port 135 inhibits (e.g., prevents) data underflow from occurring in the output buffer 325. In some embodiments, the input bandwidth of the output port 135 may be lower than the output bandwidth of the output 135 to prevent data overflow from occurring in the output buffer 325. In some embodiments, the transmitter 330 may output more than two data streams.

In some embodiments, the transmitter 330 of an output port 135 generates symbols based on the data units of data packets received from the output buffer 325 and converts the symbols into multiple serial data streams. For example, the packet engine 315 may receive 64-bit data units from the buffered crossbar 130 at a data rate of sixteen gigabits per second (16 Gb/s), convert the data units into 8-bit data bytes, and write each of the 8-bit data bytes into the output buffer 325 of the output port 135. In turn, the transmitter 330 may encode each of the 8-bit data bytes into a 10-bit symbol and convert the 10-bit symbols into four serial data streams each having a data rate of two-and-half gigabits per second (2.5 Gb/s). In this example, the clock module 300 generates the output clock signal 310 of the output port 135 such that the output clock signal 310 of the output port 135 has a frequency of two-and-a-half gigahertz (2.5 GHz). Thus, the input data rate (e.g., input bandwidth) of the output port 135 is sixteen gigabits per second (16 Gb/s) and the output data rate (e.g., output bandwidth) of the output port 135 is ten gigabits per second (10 Gb/s). Because the input bandwidth of the output port 135 is higher than the output bandwidth of the output port 135, the output port 135 inhibits (e.g., prevents) data underflow from occurring in the output buffer 325. In some embodiments, the input bandwidth of the output port 135 is lower than the output bandwidth of the output port 135 to inhibit (e.g., prevent) data overflow from occurring in the output buffer 325.

In various embodiments, the configuration module 115 is coupled (e.g., connected) to the clock module 300 or the packet engine 315, or both. In some embodiments, the configuration module 115 selects the frequency of the input clock signal 305 of an output port 135 by writing a data value indicating the frequency of the input clock signal 305 of the output port 135 into the clock module 300, and clock module 300 generates the output clock signal 310 of the output port 135 by having the frequency based on the data value. For example, the configuration module 115 may write data values indicating respective scaling factors for the input clock signal 305 of the output port 135 and the output clock signal 310 of the output port 135 into the clock module 300. In this example, the clock module 300 generates the input clock signal 305 of the output port 135 by dividing the frequency of the clock signal 145 by the scaling factor of the input clock signal 305 of the output port 135. Further, the clock module 300 generates the output clock signal 310 of the output port 135 by dividing the frequency of the clock signal 145 by the scaling factor of the output clock signal 310 of the output port 135. In some embodiments, the clock module 300 may also multiply or divide the resultant frequency of the output clock signal 310 of the output port 135 by a clocking factor to overclock or underclock the output clock signal 310 of the output port 135, as is described more fully herein.

In some embodiments, the clock module 300 corresponds to the output port 135 but is external of the output port 135. In some embodiments, the packet engine 315 corresponds to the output port 135 but is external of the output port 135. In some embodiments, the output buffer 325 corresponds to the output port 135 but is external of the output port 135. In some embodiments, an input port 125 negotiates with the source device 120 corresponding to the input port 125 to select the input bandwidth of the input port 125 and selects the frequency of the input clock signal 205 of the input port 125 based on the input bandwidth. In further embodiments, the input port 125 also selects the frequency of the output clock signal 210 of the input port 125 based on the input bandwidth.

Figure 4:
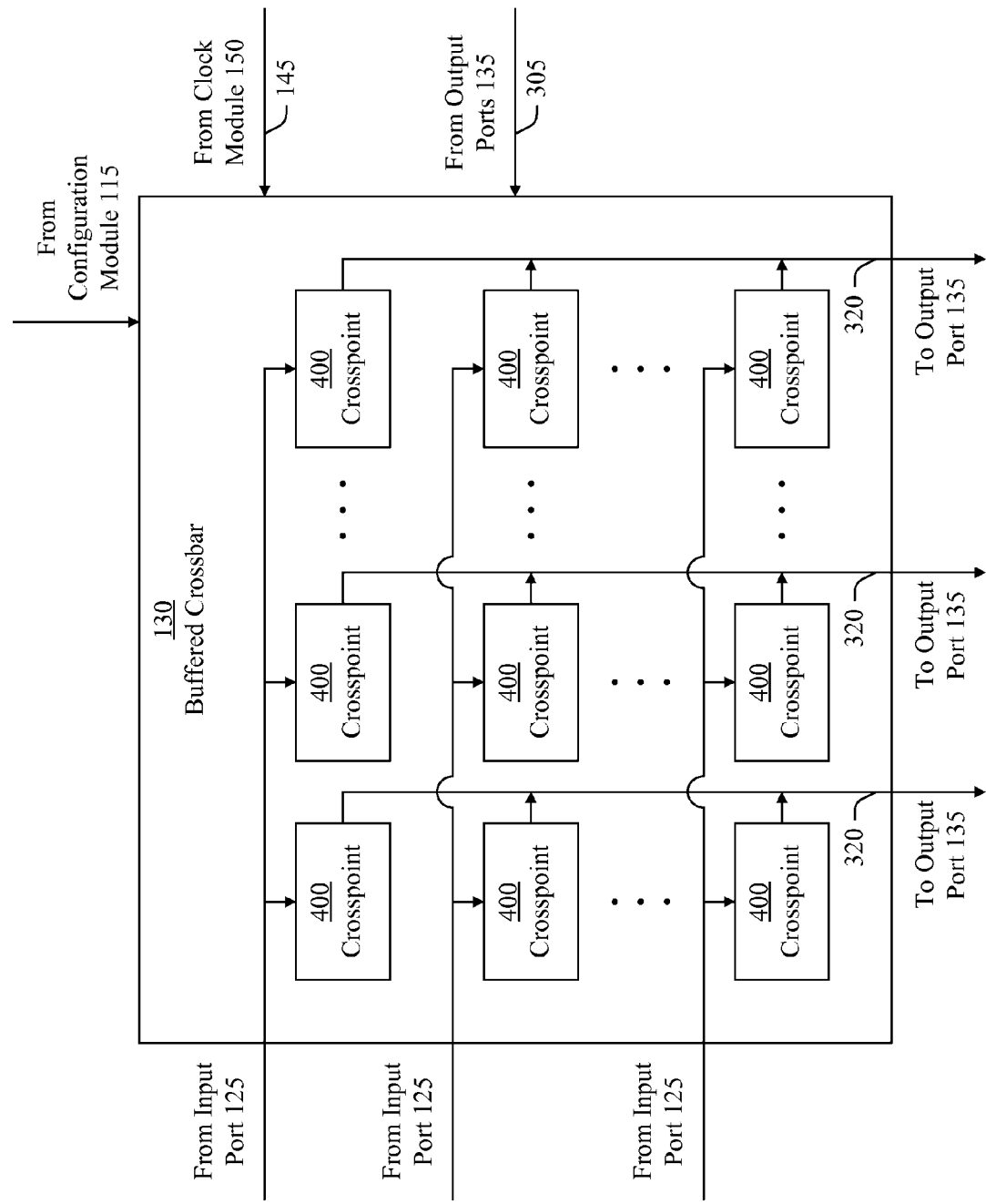
FIG. 4 is a block diagram of a buffered crossbar, in accordance with an embodiment of the present invention.

FIG. 4 illustrates the buffered crossbar 130, in accordance with an embodiment of the present invention. The buffered crossbar 130 includes crosspoints 400 interconnected with each other. Each of the crosspoints 400 is coupled (e.g., connected) to an input port 125 and an output port 135 of the packet switch 105. As may be envisioned from FIG. 4, the crosspoints 400 form a square matrix including rows of crosspoints 400 and columns of crosspoints 400. Each crosspoint 400 in a row of the matrix corresponds to an input port 125 of the packet switch 105 and is coupled (e.g., connected) to the input port 125. Moreover, each crosspoint 400 in a column of the matrix correspond to an output port 135 of the packet switch 105 and is coupled (e.g., connected) to the output port 135. In this way, each of the input ports 125 is coupled to an output port 135 through a crosspoint 400 in the buffered crossbar 130.

Each crosspoint 400 receives data units of a data packet from the input port 125 corresponding to the crosspoint 400, stores the data units of the data packet, and sends the data units of the data packet to the output port 135 corresponding to the crosspoint 400. In various embodiments, the crosspoint 400 receives a data packet from the input port 125 by receiving data 225 of the data packet, such as data units of the data packet, from the input port 125. Further, the buffered crossbar 130 sends the data packet to the output port 135 by providing data 320 of the data packet, such as data units of the data packet, to the output port 135. In one embodiment, the crosspoint 400 is capable of storing a single data unit of a data packet at a time. In other embodiments, the crosspoint 400 is capable of storing more than one data unit of a data packet at a time. In some embodiments, the crosspoint 400 is capable of storing data units of multiple data packets at the same time.

In various embodiments, each of the crosspoints 400 stores one or more data units of a data packet received from the input port 125 corresponding to the crosspoint 400 based on the output clock signal 210 generated by the input port 125. Additionally, the crosspoint 400 provides (e.g., sends) the data units stored in the crosspoint 400 to the output port 135 corresponding to the crosspoint 400 based on the clock signal 145 (e.g., the input clock signal 305 of the output port 135). In this way, the crosspoint 400 routes the data packet from the input port 125 to the output port 135. Moreover, the crosspoint 400 may store a data unit of the data packet received from the input port 125 at an input data rate (e.g., input bandwidth) and send the data unit of the data packet to the output port 135 at an output data rate (e.g., output bandwidth) that is different than the input data rate. In this way, the buffered crossbar 130 buffers data units of data packets received from input ports 125 of the packet switch 105 as the buffered crossbar 130 routes the data packets to output ports 135 of the packet switch 105.

Additionally, the crosspoint 400 arbitrates for access to the output port 135 corresponding to the crosspoint 400 with the other crosspoints 400 coupled to the output port 135 (e.g., other crosspoints 400 in the same column of the matrix). Because a crosspoint 400 stores a data unit of a data packet based on the output clock signal 210 of the input port 125 corresponding to the crosspoint 400 and sends the data unit of the data packet to the output port 135 corresponding to the crosspoint 400 based on the clock signal 145, the packet switch 105 need not include a central arbiter for routing data packets through the packet switch 105. Instead, arbitration is distributed among the packet engines 220 of the input ports 125, the packet engines 315 of the output ports 135, and the crosspoints 400.

In various embodiments, the output clock signal 210 of the input port 125 corresponding to a crosspoint 400 is in one clock domain and the clock signal 145 is in another clock domain. In these embodiments, the crosspoint 400 receives data units of a data packet from the input port 125 based on the output clock signal 210 of the input port 125 and sends the data units to the output port 135 based on the clock signal 145. In this way, the crosspoint 400 functions as a clock domain boundary between the input port 125 corresponding to the crosspoint 400 and the output port 135 corresponding to the crosspoint 400. Moreover, the data packet routed from the input port 125 to the output port 135 by the crosspoint 400 undergoes a clock domain crossing at the crosspoint 400.

In various embodiments, the output clock signal 210 of an input port 125 corresponding to a crosspoint 400 is in one clock domain and the input clock signal 305 of the output port 135 corresponding to the crosspoint 400 is in another clock domain. In these embodiments, the crosspoint 400 receives data units of a data packet from the input port 125 based on the output clock signal 210 of the input port 125 and sends the data units to the output port 135 based on the input clock signal 305 of the output port 135. In this way, the crosspoint 400 functions as a clock domain boundary between the input port 125 corresponding to the crosspoint 400 and the output port 135 corresponding to the crosspoint 400. Moreover, the data packet routed from the input port 125 to the output port 135 by the crosspoint 400 undergoes a clock domain crossing at the crosspoint 400.

In some embodiments, the output clock signals 210 of the input ports 125 and the clock signal 145 are derived from the clock signal 155. Although the output clock signal 210 of an input port 125 and the clock signal 145 may have substantially the same frequency in these embodiments, the output clock signal 210 of the input port 125 and the clock signal 145 may differ in phase. Moreover, the output clock signal 210 of the input port 125 and the clock signal 145 are in different clock domains. In other embodiments, the output clock signals 210 of the input ports 125 are derived from one or more sources other than the clock signal 155. For example, an output clock signal 210 of an input port 125 may be derived from a serial data stream received by the input port 125 and the clock signal 145 of an output port 135 may be derived from the clock signal 155. In this example, the output clock signal 210 of the input port 125 and the clock signal 145 are derived from independent sources.

In some embodiments, the configuration module 115 selects the frequency of the output clock signal 210 of the input port 125 corresponding to a crosspoint 400, which is used by the crosspoint 400 to store data packets received from the input port 125, and selects the frequency of the clock signal (e.g., the clock signal 145) used by the crosspoint 400 to send the data packets to the output port 135 corresponding to the crosspoint 400. For example, the configuration module 115 may configure the packet switch 105 to select the frequencies of these clock signals (e.g., the output clock signal 210 and the clock signal 145). In this way, the configuration module selects the output bandwidth of the input port 125 corresponding to the crosspoint 400 and the input bandwidth of the output port 135 corresponding to the crosspoint 400. Moreover, the configuration module 115 may be programmable to select the frequency of one or both of these clock signals based on user input. For example, a user may select an input data rate (e.g., input bandwidth) of an input port 125 and program the configuration module 115 to select the frequencies of the clock signals to optimize (e.g., reduce or minimize) power consumption in the packet switch 105 for the input data rate. In this way, the user selects a tradeoff between power consumption and performance of the input port 125.

In various embodiments, the frequency of the output clock signal 210 generated by an input port 125 is based on the data rate of a serial data stream containing data packets received by the input port 125. In this way, the frequency of the output clock signal 210 of the input port 125 is reduced or minimized based on the data rate of the serial data stream, which reduces or minimizes power consumption in the packet switch 105. In these embodiments, the input port 125 generates the output clock signal 210 of the input port 125 by reconstructing a clock signal (e.g., a transmit clock signal) based on the serial data stream received by the input port 125. Because the input port 125 generates the output clock signal 210 of the input port 125 based on the reconstructed clock signal, the packet switch 105 need not include an independent clock module to generate the output clock signal 210 of the input port 125, which further reduces (e.g., minimizes) power consumption in the packet switch 105.

In some embodiments, an input port 125 receives a data packet (e.g., a multicast data packet) and sends each data unit of the data packet to more than one crosspoint 400 in the buffered crossbar 130. Each of the crosspoints 400 that receives a data unit of the data packet sends the data unit to the output port 135 corresponding to the crosspoint 400. In turn, each of the output ports 135 that receives a data unit of the data packet from a crosspoint 400 outputs the data unit from the packet switch 105. In this way, the input port 125 multicasts each data unit of the data packet to multiple output ports 135 and the output ports 135 output the data units from the packet switch 105.

Figure 5:
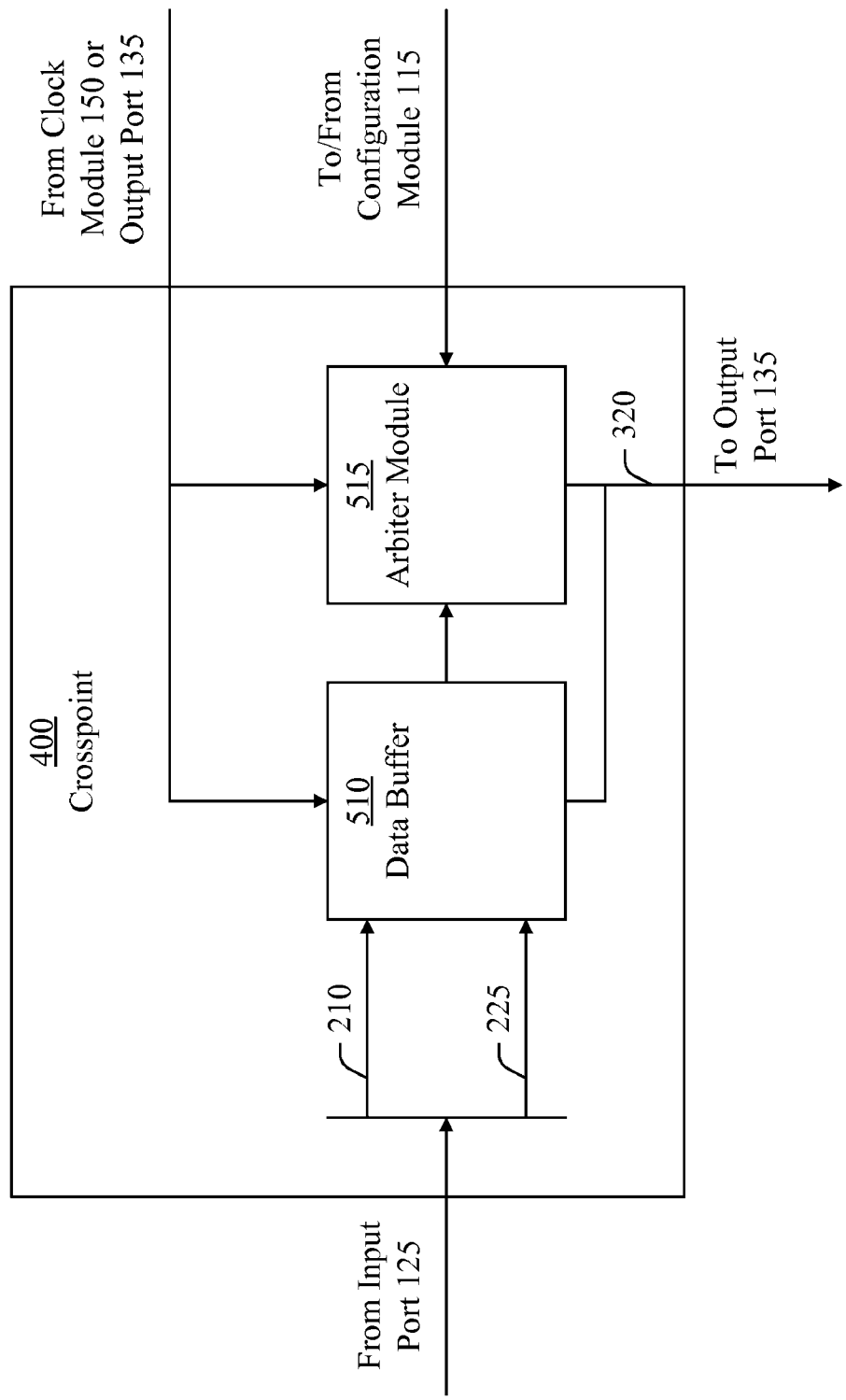
FIG. 5 is a block diagram of a crosspoint in a buffered crossbar, in accordance with an embodiment of the present invention.

FIG. 5 illustrates the crosspoint 400 of the buffered crossbar 130, in accordance with an embodiment of the present invention. The crosspoint 400 includes a data buffer 510 and an arbiter module 515 coupled (e.g., connected) to the data buffer 510. The data buffer 510 receives data units of data packets from the input port 125 corresponding to the crosspoint 400 and receives the output clock signal 210 generated by the input port 125. Moreover, the data buffer 510 stores the data units of the data packets based on the output clock signal 210 of the input port 125. The arbiter modules 515 in the buffered crossbar 130 perform arbitration in the packet switch 105 in conjunction with the packet engines 200 of the input ports 125 and the packet engines 315 of the output ports 135.

In various embodiments, the arbiter modules 515 of the crosspoints 400 in the buffered crossbar 130 corresponding to an input port 125 (e.g., the crosspoints 400 in the row corresponding to the input port 125) and the packet engine 220 of the input port 125 arbitrate for access to the input port 125. An arbiter module 515 of a crosspoint 400 that is ready to receive a data unit from the input port 125 grants access to the input port 125. The input port 125 selects the crosspoint 400 and sends a data unit to the crosspoint 400. In turn, the crosspoint 400 stores the data unit in the data buffer 510. The packet engine 315 of an output port 135 arbitrates for access to the crosspoints 400 in the buffered crossbar 130 corresponding to the output port 135 (e.g., crosspoints 400 in the column of the buffered crossbar 130 corresponding to the output port 135). The arbiter module 515 of at least one crosspoint 400 corresponding to the output port 135 and containing a data unit ready to be sent to the output port 135 grants access to the output port 135. In turn, the output port 135 selects a crosspoint 400 that granted access to the output port 135, reads one or more data units from the crosspoint 400, and outputs each data unit from the packet switch 105.

Because the output clock signal 210 of the input port 125 and the clock signal 145 are in different clock domains, the data buffer 510 functions as a clock domain boundary between the input port 125 corresponding to the crosspoint 400 and the output port 135 corresponding to the crosspoint 400. Moreover, the data packet undergoes a clock domain crossing at the data buffer 510 as the arbiter module 515 reads the data packet from the data buffer 510. In various embodiments, the data buffer 510 stores one or more data units of a single data packet. For example a data unit may be a data bit, a data byte, a data word, or an entire data packet. In other embodiments, the data buffer 510 stores data units of more than one data packet.

In various embodiments, the configuration module 115 is coupled (e.g., connected) to the arbiter module 515. In these embodiments, the configuration module 115 configures operation of the arbiter module 515. For example, the configuration module 115 may configure operation of the arbiter module 515 based on user input to the configuration module 115 to control operation of the arbiter module 515. Moreover, a user may program the arbiter module 515 by providing user input to the configuration module 115. In this way, the arbiter module 515 is programmable by the user.

In one embodiment, the clock signal 145 received by a crosspoint 400 has the same frequency as the input clock signal 305 of the output port 135 corresponding to the crosspoint, which is generated by the clock module 300 of the output port 135. In other embodiments, the clock signal 145 received by the crosspoint 400 and the input clock signal 305 of an output port 135 generated by the clock module 300 of the output port 135 corresponding to the crosspoint 400 are the same clock signal. In some embodiments, the output port 135 corresponding to a crosspoint 400 provides the input clock signal 305 of the output port 135 to the crosspoint 400. In turn, the crosspoint 400 sends data units of data packets stored in the data buffer 510 of the crosspoint 400 to the output port 135 based on the input clock signal 305 of the output port 135 instead of using the clock signal 145.

In some embodiments, the arbiter module 515 of a crosspoint 400 communicates with the output port 135 corresponding to the crosspoint 400 to send a data unit to the output port 135. For example, the output port 135 may provide a signal to the arbiter module 515 indicating that the output port 135 is ready to receive a data unit and the arbiter may obtain access to the output port 135 and send a data unit from the data buffer 510 to the output port 135. As another example, the arbiter module 515 may provide a signal to the output port 135 indicating that the data buffer 510 contains a data unit. In this example, the packet engine 315 of the output port 125 selects the crosspoint 400 containing the arbiter module 515 and reads the data unit from the data buffer 510. In this way, the crosspoint 400 sends the data unit to the output port 135. In various embodiments, the packet engine 315 of an output port 135 uses a scheduling algorithm, such as a round robin algorithm, to select a crosspoint 400 corresponding to the output port 135 and containing a data unit.

Figure 6:
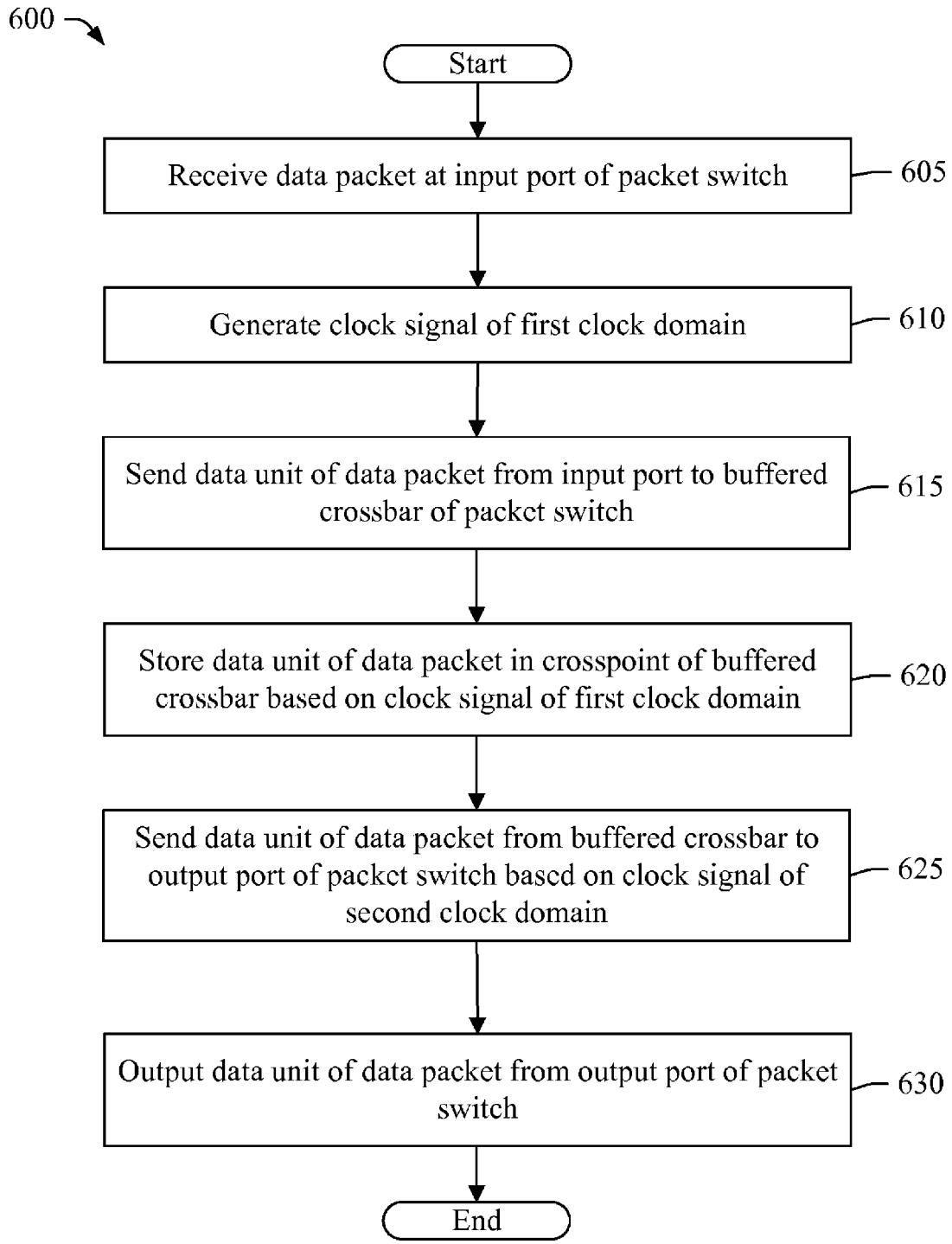
FIG. 6 is a flow chart of a method of routing a data packet through a packet switch containing a buffered crossbar, in accordance with an embodiment of the present invention.

FIG. 6 illustrates a method 600 of routing a data packet through a packet switch including a buffered crossbar. In step 605, a data packet is received at an input port of a packet switch. In various embodiments, an input port 125 of the packet switch 105 receives the data packet from the source device 120 corresponding to the input port 125. For example, the input port 125 may receive a serial data stream containing the data packet or a parallel data stream containing the data packet. The method 600 then proceeds to step 610.

In step 610, a clock signal is generated for a first clock domain. In various embodiments, the clock module 200 in the input port 125 generates the clock signal of the first clock domain by generating an output clock signal 210 of the input port 125. In some embodiments, the clock module 200 generates the output clock signal 210 of the input port 125 based on a serial data stream received by the input port 125. In other embodiments, the clock module 200 generates the output clock signal 210 of the input port 125 based on a parallel data stream received by the input port 125. For example, the input port 125 may receive a clock signal along with the parallel data stream and generate the output clock signal 210 of the input port 125 based on the clock signal of the parallel data stream. The method 600 then proceeds to step 615.

In step 615, a data unit of the data packet is sent from the input port to a buffered crossbar of the packet switch. In various embodiments, the input port 125 sends the data unit of the data packet to the buffered crossbar 130 of the packet switch 105 based on the output clock signal 210 of the first clock domain. In some embodiments, the packet engine 220 of the input port 125 sends the data unit of the data packet to more than one crosspoint 400 of the buffered crossbar 130 based on the output clock signal 210 of the first clock domain. For example, the data packet may be a multicast data packet. In this way, the input port 125 multicasts the data unit of the data packet to the buffered crossbar 130. The method 600 then proceeds to step 620.

In step 620, the data unit of the data packet is stored in the buffered crossbar of the packet switch. In various embodiments, the buffered crossbar 130 of the packet switch 105 stores the data unit of the data packet received from input port 125 based on the output clock signal 210 of the first clock domain. In some embodiments, a crosspoint 400 corresponding to the input port 125 in the buffered crossbar 130 stores the data unit of the data packet based on the output clock signal 210 of the input port 125 (e.g., the clock signal of the first clock domain). In other embodiments, more than one crosspoint 400 corresponding to the input port 125 stores the data unit of the data packet based on the output clock signal 210 of the input port 125. For example, the data packet may be a multicast data packet. The method 600 then proceeds to step 625.

In step 625, the data unit of the data packet is sent to an output port of the packet switch based on a clock signal of a second clock domain. In various embodiments, the buffered crossbar 130 sends the data unit of the data packet stored in the buffered crossbar 130 to an output port 135 of the packet switch 105 based on a clock signal 145 in a second clock domain. In some embodiments, the output port 135 reads the data unit of the data packet from a crosspoint 400 in the buffered crossbar 130. In this way, the buffered crossbar 130 sends the data unit to the output port 135. In some embodiments, the buffered crossbar 130 sends the data unit of the data packet to more than one output port 135. For example, the data packet may be a multicast data packet and more than one crosspoint 400 may send the data unit to output ports 135 corresponding to those crosspoints 400. The method 600 then proceeds to step 630.

In step 630, the data unit of the data packet is output from the packet switch. In various embodiments, the output port 135 receiving the data unit of the data packet outputs the data packet from the packet switch 105. In some embodiments, the output port 135 outputs the data unit of the data packet to the destination device 140 corresponding to the output port 135 based on the clock signal 145. For example, the output port 135 may output the data unit of the data packet from the packet switch 105 to the destination device 140 corresponding to the output port 135 based on the output clock signal 310 of the output port 135, which is derived from the clock signal 145. In some embodiments, more than one output port 135 outputs the data unit of the data packet to destination devices 140 corresponding to those output ports 135. For example, the data packet may be a multicast data packet. The method 600 then ends.

In various embodiments, the method 600 may include more or fewer steps than the steps 605-630 described above and illustrated in FIG. 6. In some embodiments, one or more of the steps 605-630 of the method 600 may be performed in parallel or substantially simultaneously. In various embodiments, the steps 605-630 of the method 600 may be performed in a different order than the order described above and illustrated in FIG. 6.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
a buffered crossbar comprising a crosspoint;
an input port coupled to the buffered crossbar, the input port configured to receive at least one data unit of a data packet and send the at least one data unit of the data packet to the crosspoint, the crosspoint configured to store the at least one data unit of the data packet based on a clock signal of a first clock domain;
a configuration module that is programmable to select a frequency of the clock signal in the first clock domain for reducing power consumption in the packet switch; and
an output port coupled to the buffered crossbar, the crosspoint configured to send the at least one data unit of the data packet to the output port based on a clock signal of a second clock domain, the output port configured to output the at least one data unit of the data packet from the packet switch.

2. The packet switch of claim 1, wherein the configuration module is programmable to select the frequency of the clock signal in the second clock domain.

3. The packet switch of claim 1, wherein the input port is configured to receive a serial data stream transmitted based on a transmit clock signal and comprising the data packet, and a clock module is configured to generate the clock signal of the first clock domain by reconstructing the transmit clock signal from the serial data stream.

4. A packet switch comprising:
a buffered crossbar comprising a crosspoint;
an input port coupled to the buffered crossbar, the input port configured to receive at least one data unit of a data packet and send the at least one data unit of the data packet to the crosspoint, the crosspoint configured to store the at least one data unit of the data packet based on a clock signal of a first clock domain, the input port further configured to receive a serial data stream transmitted based on a transmit clock signal and comprising the data packet;
a clock module configured to generate the clock signal of the first clock domain by reconstructing the transmit clock signal from the serial data stream;
a configuration module that is programmable to select a frequency of the clock signal in the first clock domain for reducing power consumption in the packet switch;
a receiver coupled to an input of the input port and configured to convert the serial data stream into the at least one data unit of the data packet based on the clock signal of the first clock domain;
an input buffer coupled to the receiver and configured to store the at least one data unit of the data packet;
a packet engine coupled to the input buffer and configured to route the at least one data unit of the data packet to the buffered crossbar; and
an output port coupled to the buffered crossbar, the crosspoint configured to send the at least one data unit of the data packet to the output port based on a clock signal of a second clock domain, the output port configured to output the at least one data unit of the data packet from the packet switch.

5. The packet switch of claim 4, wherein the clock signal of the first clock domain and the clock signal of the second clock domain are derived from a system clock signal.

6. A system comprising:
a plurality of source devices;
a plurality of destination devices; and
a packet switch coupled to the plurality of source devices and the plurality of destination devices, the packet switch comprising:
a plurality of input ports configured to receive data packets from the plurality of source devices;
a plurality of clock modules each configured to generate a clock signal for a corresponding input port of the plurality of input ports, each clock signal being in a clock domain corresponding to the clock signal;
a configuration module coupled to the clock module and configured to select a frequency of each generated clock signal for reducing power consumption in the packet switch;
a plurality of output ports configured to output the data packets to the plurality of destination devices; and
a buffered crossbar coupled to the plurality of input ports, the plurality of output ports, and the plurality of clock modules, the buffered crossbar comprising a plurality of crosspoints each configured to receive at least one data unit of a data packet from a corresponding input port of the plurality of input ports, store the at least one data unit of the data packet based on the clock signal of the input port, and send the at least one data unit of the data packet to a corresponding output port of the plurality of output ports based on a clock signal of the output port in another clock domain.

7. The system of claim 6, wherein the configuration module is programmable to select the frequency of the clock signal of the output port.

8. The system of claim 6, wherein at least one crosspoint of the plurality of crosspoints is a clock domain boundary between a clock signal of the input port in a first clock domain and a clock signal of an output port in a second clock domain.

9. The system of claim 6, wherein each generate clock signal for an input port and the clock signal of the output port are derived from a system clock signal.

10. A system comprising:
a plurality of source devices;
a plurality of destination devices; and
a packet switch coupled to the plurality of source devices and the plurality of destination devices, the packet switch comprising:
a plurality of input ports configured to receive data packets from the plurality of source devices;
a plurality of clock modules each configured to generate a clock signal for a corresponding input port of the plurality of input ports, each clock signal being in a clock domain corresponding to the clock signal;
a configuration module that is programmable to select a frequency of each generated clock signal for an input port for reducing power consumption in the packet switch;
a plurality of output ports configured to output the data packets to the plurality of destination devices;
a buffered crossbar coupled to the plurality of input ports, the plurality of output ports, and the plurality of clock modules, the buffered crossbar comprising a plurality of crosspoints each configured to receive at least one data unit of a data packet from a corresponding input port of the plurality of input ports, store the at least one data unit of the data packet based on the clock signal of the input port, and send the at least one data unit of the data packet to a corresponding output port of the plurality of output ports based on a clock signal of the output port in another clock domain; and
a first input port of the plurality of input ports, a source device of the plurality of source devices configured to transmit a serial data stream comprising a data packet based on a transmit clock signal to the first input port, the clock module corresponding to the first input port configured to generate the clock signal of the first input port by reconstructing the transmit clock signal from the serial data stream, the first input port further comprising:
a receiver configured to receive the serial data stream and convert the serial data stream into at least one data unit of the data packet transmitted by the source device;
an input buffer coupled to the receiver and configured to store the at least one data unit of the data packet transmitted by the source device; and
a packet engine coupled to the input buffer and configured to route the at least one data unit of the data packet transmitted by the source device to the buffered crossbar.

11. A method of routing data packets through a packet switch, the method comprising:
receiving a data packet at an input port of the packet switch:
generating a clock signal of a first clock domain, the frequency of the clock signal in the first clock domain selected by a programmable configuration module for reducing power consumption in the packet switch;
sending at least one data unit of the data packet from the input port to a buffered crossbar of the packet switch;
storing the at least one data unit of the data packet in a crosspoint of the buffered crossbar based on the clock signal of the first clock domain;
selecting a frequency of t-he a clock signal of t-he a second clock domain: sending the at least one data unit of the data packet from the buffered crossbar to an output port of the packet switch based on the clock signal of the second clock domain; and
outputting the at least one data unit of the data packet from the packet switch.

12. The method of claim 11, wherein receiving the data packet at the input port of the packet switch comprises receiving a serial data stream transmitted based on a transmit clock signal and comprising the data packet, and generating the clock signal of the first clock domain comprises reconstructing the transmit clock signal based on the serial data stream.

13. The method of claim 12, further comprising:
storing the data packet received by the input port; and
converting the serial data stream into the at least one data unit of the data packet based on the clock signal of the first clock domain.

14. The method of claim 11, wherein the clock signal of the first clock domain and the clock signal of the second clock domain are derived from a system clock signal.

* * * * *